Mar. 20, 1923.
J. G. ROSS.
DIRECTION SIGNAL.
FILED SEPT. 14, 1921.
1,449,297.
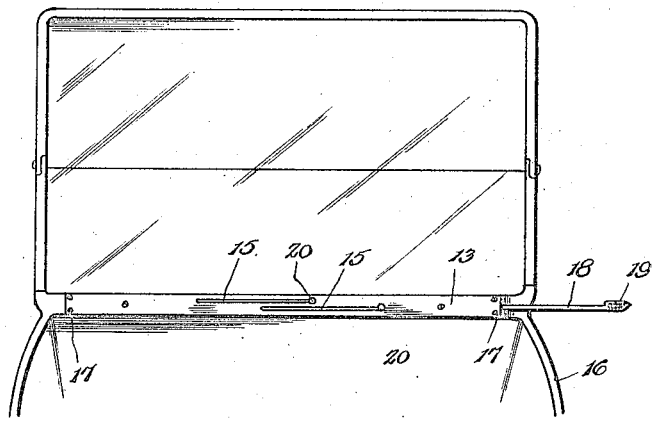
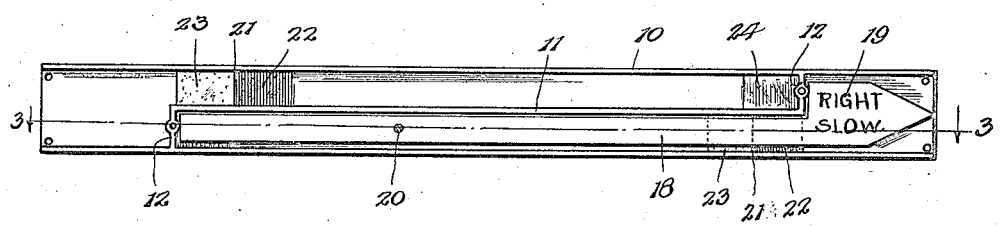
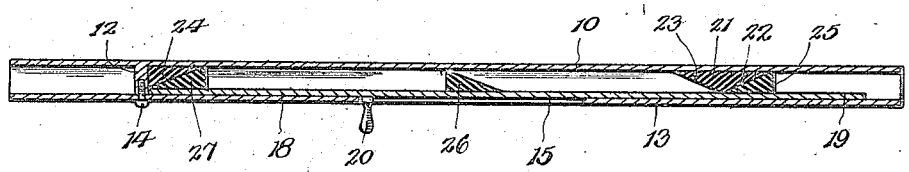
Inventor
J. G. Ross.

Patented Mar. 20, 1923.

1,449,297

UNITED STATES PATENT OFFICE.

JAMES G. ROSS, OF SEATTLE, WASHINGTON.

DIRECTION SIGNAL.

Application filed September 14, 1921. Serial No. 500,602.

*To all whom it may concern:*

Be it known that I, JAMES G. ROSS, citizen of the United States, residing at Seattle, in the county of King and State of Washington, have invented certain new and useful Improvements in Direction Signals, of which the following is a specification.

This invention relates to an improved direction signal for motor vehicles and seeks to provide, among other objects, a particularly simple and effective device of this character which may be easily operated for indicating an intention to turn either to the right or left.

The invention has as a further object to provide a device which will be inexpensive and may thus prove popular.

And the invention has as a still further object to provide a device which will be adapted for general use upon different makes of motor vehicles.

Other and incidental objects will appear hereinafter.

In the drawing:

Figure 1 is a fragmentary elevation showing my improved device in connection with a motor vehicle, Figure 2 is an elevation of the device, the rear closure plate of the casing being removed, and Figure 3 is a longitudinal sectional view on the line 3—3 of Figure 2, looking in the direction of the arrows.

Referring now more particularly to the drawing, it will be seen that I employ an oblong casing 10. This casing may be formed of sheet metal or other approved material and extending longitudinally within the casing medially thereof is a partition 11 having oppositely directed end walls 12 extending transversely within the casing to the top and bottom walls thereof. The partition may be formed integral with the casing and, as will be observed, said partition divides the casing into companion compartments, the walls 12 of the partition being located near the ends of the casing. Closing the casing is a front plate 13 forming one side wall of the casing. This plate is secured in position by screws or other approved fastening elements 14 threaded into the walls 12 of the partition and formed on said plate are, as best shown in Figure 1, longitudinally directed slots 15. In Figure 1 of the drawing, I have illustrated my improved signal in connection with a conventional motor vehicle 16 and, as shown, the casing 10 of the device is preferably mounted at the base of the windshield to extend transversely of the vehicle, being secured in position by pairs of screws 17 arranged to extend through the plate 13 and through the back wall of the casing at the ends thereof.

Slidable within the compartments of the casing are companion indicators 18 each provided at its outer end with a laterally enlarged or widened arrow-shaped head 19, the overhanging inner end edges of which are disposed to confront the end walls 12 of the partition 11. Preferably, when retracted, the indicators lie wholly within the casing and the heads 19 thereof may be painted or otherwise decorated to render the indicators conspicuous. If desired, the head of one indicator may bear the word Left and the head of the other indicator the word Right. Extending from the indicators through the slots 15 are operating handles 20 which may be readily grasped for shifting the indicators outwardly to project, as suggested in Figure 1, laterally from the vehicle, the indicator at the left being shifted to indicate an intention to turn to the left while the indicator at the right is shifted to indicate an intention to turn to the right. Normally, the indicators will, of course, be retracted within the casing. Mounted within each of the compartments of the casing near the mouth thereof is a stop cushion 21 having oppositely sloping faces 22 and 23 respectively. These cushions may be formed of rubber or other approved material and are appropriately secured to the back wall of the casing. Arranged at the inner ends of the casing compartments are stop cushions 24 also provided with beveled faces sloping away from the end wall 12 of the partition 11, the cushions being arranged to abut said end walls. The cushions 24, like the cushions 21, may be formed of rubber and are appropriately connected to the back wall of the casing. Suitably secured to the indicators 18 at their inner sides are wedges 25 arranged near the outer ends of said indicators. Similar wedges 26 are mounted upon the indicators in spaced relation to the wedges 25 while upon the inner ends of the indicators are arranged like wedges 27. All of these wedges may also be formed of rubber.

As will now be seen in view of the preceding description, when the indicators are retracted within the casing, the wedges 25 will engage the beveled faces 22 of the cushions 21 while the wedges 27 will engage with the cushions 24. Thus, the wedges will coact with said cushions for yieldably limiting the indicators in their inward movement while the indicators will be yieldably wedged against the face plate 13 of the casing to prevent rattling. Similarly, when the indicators are shifted outwardly to signaling position, the wedges 26 will engage the beveled faces 23 of the cushions 21 for yieldably limiting said indicators in their outward movement while the indicators will be yieldably wedged against the face plate of the casing to prevent rattling. I accordingly provide a highly efficient device for the purpose set forth and, as will now be clear, a device which may be readily applied to practically any automobile.

Having thus described the invention, what is claimed as new is:

1. A direction signal including a casing, an indicator therein shiftable outwardly to project from the casing, and yieldable means for stopping and wedging the indicator against rattling at the limit of its outward movement.

2. A direction signal including a casing, an indicator therein shiftable outwardly to project from the casing or inwardly to retracted position, and yieldable means for stopping and wedging the indicator against rattling at the limit of its inward movement.

3. A direction signal including a casing, an indicator therein shiftable outwardly to project from the casing, a cushion carried by the casing, and a wedge upon the indicator disposed to engage said cushion for limiting the indicator in its outward movement and binding the indicator against rattling.

4. A direction signal including a casing, an indicator therein shiftable outwardly to project from the casing or inwardly to retracted position, a cushion carried by the casing, a wedge upon the indicator disposed to engage the cushion for limiting the indicator in its outward movement and binding the indicator against rattling, and a second wedge upon the indicator disposed to engage the cushion for limiting the indicator in its inward movement and binding the indicator against rattling.

5. A direction signal including a casing, an indicator therein shiftable outwardly to project from the casing or inwardly to retracted position, a cushion carried by the casing, a wedge upon the indicator disposed to engage the cushion for limiting the indicator in its outward movement and binding the indicator against rattling, a second cushion upon the casing, and additional wedges upon the indicator disposed to engage said cushions for limiting the indicator in its inward movement and binding the indicator against rattling.

In testimony whereof I affix my signature.

JAMES G. ROSS. [L. S.]